United States Patent [19]

Bowater et al.

[11] Patent Number: 5,404,446

[45] Date of Patent: Apr. 4, 1995

[54] DUAL BUFFER VIDEO DISPLAY SYSTEM FOR THE DISPLAY OF ASYNCHRONOUS IRREGULAR FRAME RATE VIDEO DATA

[75] Inventors: Ronald J. Bowater, Romsey; Barry K. Aldred, Winchester; Steven P. Woodman, Romsey, all of England

[73] Assignee: International Business Machines Corporation, Armonk, N.Y.

[21] Appl. No.: 37,197

[22] Filed: Mar. 26, 1993

[30] Foreign Application Priority Data

Mar. 26, 1992 [GB] United Kingdom ............... 9206554

[51] Int. Cl.⁶ ............................................. G06F 15/20
[52] U.S. Cl. .................................................. 395/162
[58] Field of Search ............... 395/101, 162, 164, 200, 395/250; 358/85, 86, 183, 903; 370/62; 380/18; 382/56; 345/185, 186, 189, 192, 196, 200

[56] References Cited

U.S. PATENT DOCUMENTS

| | | | |
|---|---|---|---|
| 4,027,100 | 5/1977 | Ishiguro | 178/69.1 |
| 4,394,774 | 7/1983 | Widergren et al. | 382/56 |
| 4,949,169 | 8/1990 | Lumelsky et al. | 358/86 |
| 4,995,071 | 2/1991 | Weber et al. | 379/53 |
| 5,014,267 | 5/1991 | Tompkins et al. | 370/62 |
| 5,062,136 | 10/1991 | Gattis et al. | 380/18 |
| 5,192,999 | 3/1993 | Graczyk et al. | 358/85 |
| 5,262,965 | 11/1993 | Putnam et al. | 395/101 |

FOREIGN PATENT DOCUMENTS

| | | | |
|---|---|---|---|
| 0031031 | 7/1981 | European Pat. Off. | G06F 13/00 |
| 0382182 | 8/1990 | European Pat. Off. | G06F 13/12 |
| 0274703 | 7/1988 | Germany | G06F 3/06 |
| 8600482 | 1/1986 | WIPO | H04L 25/49 |

OTHER PUBLICATIONS

SMPTE Journal, vol. 85, Jun. 1976, pp. 385–388, Matley, "A Digital Framestore Synchronizer".

IBM Technical Disclosure Bulletin, vol. 10, No. 1, Jun. 1967, pp. 34–36, H. E. Jenkins et al., "Asynchronous Control of Data Transfer".

Primary Examiner—Mark R. Powell
Assistant Examiner—U. Chauhan
Attorney, Agent, or Firm—Martin J. McKinley

[57] ABSTRACT

A video signal is received from an asynchronous link (15) at an irregular frame rate for display on a computer monitor 9 at a regular frame rate. Frames are transferred to the monitor via first and second buffers (23, 25). A control process (27) manages the transfer of frames between the first and second buffers and is responsible for deciding if, when and how many frames to transfer, in order to minimise the delay between the incoming image and the displayed image.

7 Claims, 1 Drawing Sheet

DUAL BUFFER VIDEO DISPLAY SYSTEM FOR THE DISPLAY OF ASYNCHRONOUS IRREGULAR FRAME RATE VIDEO DATA

BACKGROUND OF THE INVENTION

The present invention relates to the computer display of a video signal transmitted over an asynchronous network.

Recent developments in computer technology enable users of remote computers to communicate using interactive digital video; see, for example, the March 91 issue of PC Week. Each user has a personal computer or workstation equipped with a card, such as the Intel/IBM ActionMedia II (AMII) card, to allow the computer to process and display video images. (IBM is a trademark of the IBM Corporation, and Intel and ActionMedia are trademarks of the Intel Corporation.) The workstations are connected together by a relatively wideband communication channel, such as an Integrated Services Digital Network (ISDN) or Local Area Network (LAN). A camera at one workstation provides a video image which is transmitted, in compressed form, across the network. This video signal is received and displayed at one or more other workstations to provide real-time visual communication between users.

Traditionally, video signals have been transmitted over fully synchronous or isochronous links. In such systems a camera obtains a video signal at a fixed frame rate, which is then transmitted to and displayed at a receiving station, all at the same fixed rate. By contrast, computer networks provide asynchronous communication in which information is usually transmitted in individual packets to allow any loss or corruption of data to be detected. The time between dispatch and receipt of a packet varies according to the amount of traffic on the network and other factors.

In computer-based video communication systems, a video signal is obtained from the camera at a constant frame rate but, after transmission across the asynchronous or non-ideal network, the frames arrive at irregular intervals. Some frames arrive early, some are delayed, and bunching can occur. The display device at the receiving terminal, however, generally requires a constant frame rate supplied to it (e.g., to match the raster scan rate of a CRT). In such systems it is therefore necessary to match the irregular arrival of frames over the network with the constant supply required to the output screen.

It is known in multimedia systems, in which video sequences are read from optical disks, to compensate for the mismatch in rate between data coming from the disk and the display of the images by filling a buffer with frames prior to play-out to the display device. However, it is difficult to adopt this approach in video conferencing applications, since each frame stored in the buffer adds to the delay between capture and final display of a video image. Too large a delay is very intrusive in interactive communications. The designer of computer based video communication systems is therefore faced with the problem of how to achieve regular play-out of the asynchronous incoming video signal while, at the same time, minimising the number of buffered video frames.

SUMMARY OF THE INVENTION

This invention provides a computer system for displaying on a computer screen at a regular frame rate a video signal received from an asynchronous network at an irregular frame rate. This system includes first buffer means for storing incoming frames received from the network, second buffer means for supplying frames to the screen at said regular rate, and control process means for transferring the frames from the first buffer to the second buffer. The control process can decide whether to transfer frames from the first to second buffer and, if so, when and how many frames to transfer, or whether to delete frames instead. This gives the system much more flexibility and power than a system having just a single buffer.

In a preferred embodiment, the control process determines the current number of frames in the second buffer, and transfers frames from the first buffer to the second buffer when the current number of frames in the second buffer is below a predetermined limit. However, transfer according to other criteria is also feasible; for example, by predicting from the current level of occupation and the play-out rate how soon the second buffer will empty.

Preferably, the control process determines the number of frames to transfer from the first buffer to the second buffer in accordance with an estimated level of CPU activity and the current number of frames in the second buffer. The estimated level of CPU activity indicates how long the control process is likely to have to wait before the next opportunity to refill the buffer. By adjusting the number of frames to transfer to the second buffer accordingly, the total number of stored frames can be reduced without increasing the risk of buffer starvation.

In one preferred embodiment, the second buffer sends a message to the control process when the number of frames in the second buffer falls below a predetermined limit, and the estimate of CPU activity is based on the time taken for the message from the second buffer to reach the control process. In an alternative embodiment, the control process repeatedly interrogates the second buffer to determine the number of frames therein, and the estimate of CPU activity is based on the time interval between successive interrogations of the second buffer. In either case, the relevant time is, preferably, calculated from the difference between the current number frames in the second buffer and the predetermined limit.

It is also advantageous, on occasions when the first buffer is empty and the second buffer needs more frames, for the control process to create null frames for transfer to the second buffer. This, again, reduces the risk of buffer starvation of the second buffer. Since any nulls so inserted add to the effective buffering, it is also useful to be able to delete delayed frames when they do finally arrive, so as to allow the displayed image to catch up with the received one. In a system in which the video is compressed as a sequence of still and relative frames, this is preferably achieved when the first buffer is full by: (i) if the incoming frame is a still frame, flushing the contents of the first buffer, or (ii) if the incoming frame is a relative frame, flushing the contents of the first buffer up to the first still frame.

In a preferred embodiment, the first buffer is implemented as a circular buffer that can contain one more frame than the maximum number of relative frames between successive still frames, although any implementation of a First In First Out (FIFO) queue could be used.

The present invention also provides a method of displaying on a computer screen at a regular frame rate a video signal received from an asynchronous network at an irregular frame rate This method comprising the steps of: storing incoming frames received from the network in a first buffer, supplying frames to the screen at said regular rate from a second buffer, and operating a control process to transfer the frames from the first buffer to the second buffer.

DESCRIPTION OF AN ILLUSTRATIVE EMBODIMENT

Figure 1:
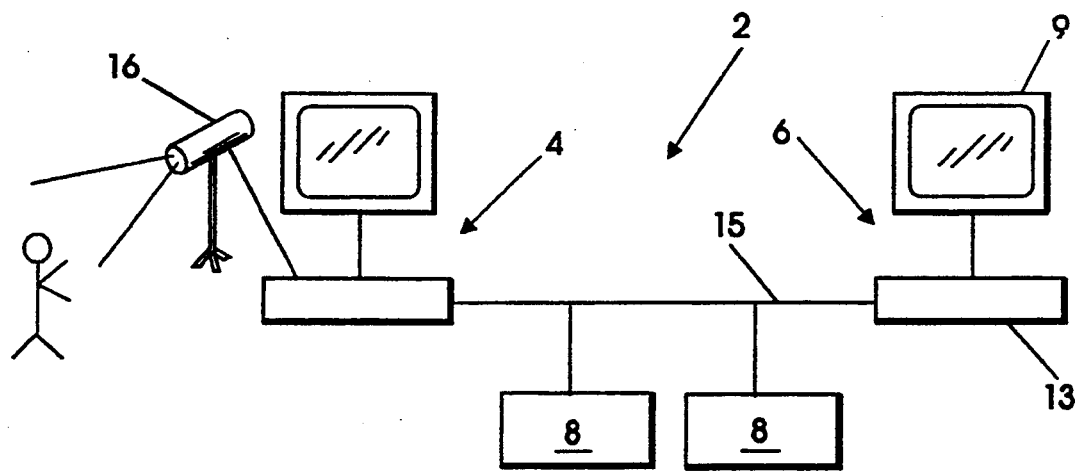
FIG. 1 is a schematic diagram of computers connected by an asynchronous network.

FIG. 1 shows a network 2 of computers 4, 6, 8 connected by an asynchronous communication channel 15 (e.g., LAN or ISDN). A camera 16 at a first computer 4 obtains a video signal, normally of the user, which is compressed and submitted to the network. The signal is then transmitted down the communication channel in packet format before arriving at the destination computer 6. Typically, this second computer includes hardware such as the Intel/IBM ActionMedia II (AMII) card, which is responsible for actually decompressing and displaying the video image on the screen 9. In video conferencing applications, the reverse process also occurs; i.e., the second computer is simultaneously sending an image of its user back to the first computer 4 for display. It is also possible to set up multi-way conferences.

Figure 2:
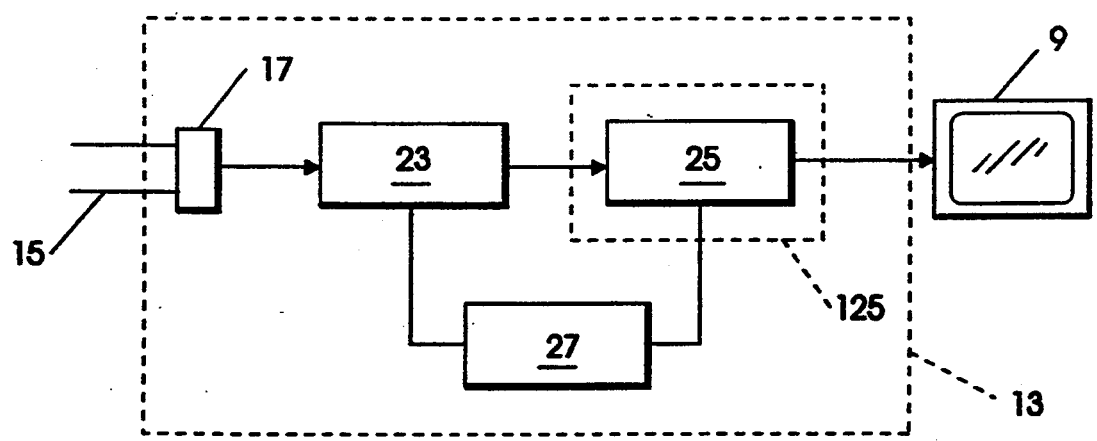
FIG. 2 is a schematic diagram showing a computer system according to the invention.

With reference now to FIG. 2, the incoming video signal from the communication subsystem 15 arrives at the workstation 13 for display on the associated monitor 9. The signal is transferred first to a buffer 23, and then to the AMII card 125 or, more particularly, to the AudioVisual Kernel (AVK) interface buffer 25 of the AMII card. The buffer 23 provides a FIFO queue, conveniently implemented as a circular buffer. A control process 27 is responsible first for reading incoming data into the circular buffer, and then for transferring data from the circular buffer to the AVK.

Video images are captured at the source computer at a frame rate of 15 frames per second (in this particular embodiment), which is sufficient to provide moderate quality video. This is also the rate at which they are read out of the AVK to the screen. However, the transmission rate over the network is variable, depending on network load, etc., so that the arrival rate at the end of the computer subsystem departs from this 15 Hz clock. Changes in CPU activity at the source and destination computers can also lead to variations in the effective frame arrival rate. Individual frames can have either a positive or negative offset from their nominal arrival time, although it is assumed that frames do, in fact, arrive in the correct sequence. It should be noted that the variation in arrival times is such that, even if the hardware could display each frame directly on arrival, the resulting sequence would be so temporally distorted as to be unwatchable. Thus, some form of buffering is essential.

Together, the AVK and circular buffer compensate for the variable arrival rate of the video frames by introducing a time-lag, T(L), between the received and displayed images. Any frame arriving within T(L) of its nominal arrival time can be properly displayed. Only if a frame arrives more than T(L) late, will the AVK and circular buffer empty and the video image will freeze. To decrease the risk of buffer starvation, the buffer size can be increased to make T(L) larger, but with a 15 frames per second transmission rate, storing only 10 frames adds a delay of ⅔ second. If the effectiveness of interactive applications such as video conferencing is not to be seriously degraded, only a handful of frames can be buffered with T(L) correspondingly small.

The control process is responsible first for receiving data into the circular buffer, and then for forwarding it to the AVK. There is no control over output from the AVK, which is at a fixed rate. As explained in more detail below, the AVK requests frames from the circular buffer as required. Clearly, if frames are present in the circular buffer, then these can be forwarded to the AVK. However, in video conferencing or other interactive applications where the overall amount of buffering is limited, there may occasionally be particularly long delays on the network during which time the circular buffer empties. In this case, the control process reacts by loading the AVK with null frames. A null frame is essentially the same as the preceding frame, so that, as far as the viewer is concerned, video image temporarily freezes. Thus, each time the control process fails to find frames in the circular buffer, the requisite number of null frames are loaded into the AVK instead.

Although the user may not notice the insertion of individual null frames, each null frame adds to the overall delay in the system (i.e., it is effectively another form of buffering). If more and more null frames are inserted into the video stream, then this will, again, lead to an intrusive delay between transmission and display. This problem can be overcome by the circular buffer throwing away real data when the delayed frames do finally arrive. These frames are then effectively lost, allowing the displayed image to catch up with the incoming signal. It is the presence of two buffers that gives the flexibility to lose frames in this way, and so cope with occasional delays longer than T(L).

The technique used to discard frames exploits the fact that, due to the limited bandwidth of the channel, the video signal is compressed before transmission over a computer based communication line. Basically, two types of compression, spatial and temporal, are used. In the former, the redundancy within a single frame is removed, for example, by using the fact that adjacent pixels often have closely related brightness and color values. A frame encoded using only spatial compression is known as a "still frame". Temporal compression achieves a further level of compression by exploiting the fact that the luminosity and color of the same pixel in two consecutive frames are, again, likely to be highly correlated. Therefore, in temporal compression, a frame is encoded as a "relative frame" in terms of its difference from the previous frame (we assume that a relative frame is also spatially compressed). The greatest reduction in data is achieved if every frame (apart from the first) is a relative frame, but this is highly error prone since the loss of a single frame will produce defects that persist for all subsequent frames. Therefore, as a compromise, every Nth frame can be sent as a still frame, with all intervening frames as relative frames, so that the result of compression is a regularly spaced series of frames whose size varies somewhat according to the temporal and spatial content of the data and, of course, whether that particular frame is a still or relative frame.

In the present embodiment, N=6 (i.e., there are 5 relative frames for each still frame), although, sometimes, if there is a lot of movement so that successive frames are dissimilar, then the frequency of still frames is increased (i.e., N=6 is effectively an upper limit).

The input strategy of the circular buffer can now be considered in more detail, regarding it as a simple FIFO queue. When the buffer is not full, then incoming frames can be added to the buffer in the normal way. However, when the buffer is full, there are two possible actions. If the incoming frame is a still frame, then the entire buffer is flushed before the incoming still frame is added to the queue. Alternatively, if the incoming frame is a relative frame, then only relative frames below (i.e., that arrived earlier than) a still frame are flushed. This is because the previous still frame is still required to make sense of the relative frames. In either case, flushing the buffer results in some frames being thrown away, and so the displayed image catches up slightly with the received image.

For this strategy to be successful, the FIFO queue must be able to contain at least N frames (i.e., 1 still frame and N-1 relative frames). As discussed above, the queue is most easily implemented using a circular buffer that can contain N frames, with independent input and output pointers. Note that, if the number of relative frames between each still frame did not vary and was constantly one less than the size of the buffer, then overwriting of the circular buffer would occur automatically every N frames as desired, and so no explicit checking to determine whether the incoming frame was still or relative would be required.

Turning now to the AVK, frames are read out from the AVK for display at a fixed rate. This leads to the possibility of buffer starvation if the AVK contains no more frames to read out to the screen. In such an eventuality, the AVK pipeline needs to be reset, requiring a considerable system overhead during which time the video image is not updated, in contrast to the circular buffer, which can be emptied and refilled without penalty.

Accordingly, a lower limit, V(L), is set for the number of frames in the AVK. This value is selected to substantially preclude buffer starvation yet, at the same time, not introduce an unacceptable delay. The control process responsible for transferring frames from the circular buffer to the AVK then tries to maintain the number of frames in the AVK as close as possible to but slightly above V(L).

In one embodiment of the present invention, the control process determines the current number of frames, V(C), in the AVK each time it is scheduled (assuming that the process is running under a multitasking operating system such as OS/2 or UNIX). When the CPU is only lightly loaded, the control process will be scheduled frequently whereas, if heavily loaded, there will be delays between successive scheduling of the process. In OS/2, the scheduling interval is 1/18 seconds; i.e., comparable to the frame time so that, each time the control process misses a scheduling slot, the AVK is further depleted.

If V(C) is found to be less than V(L), then more frames must be transferred from the circular buffer to the AVK. The process determines how many frames to transfer based on the value of V(L)-V(C). Because frames are read out of the AVK at a fixed rate, this difference indicates how frequently the control process is being scheduled, which in turn indicates how heavily the CPU is loaded. The process can then use this measure of the CPU loading to determine how many frames to load into the AVK, based on the assumption that the CPU loading and, hence scheduling interval, is likely to remain approximately constant. If the CPU is heavily loaded, then more frames must now be loaded into the AVK, since it is probably relatively long before the next opportunity to reload the AVK occurs. Similarly, if the CPU is only lightly loaded, then fewer frames need be added to the AVK, since it should not be depleted before the next refill process, which is likely to be scheduled soon.

In this particular embodiment, the number of frames to be loaded, V(+), is calculated according to the following formula: $V(+) = k [V(L) - V(C)]$, where k is a compensating factor whose value depends on the seriousness of buffer starvation. For example, if buffer starvation requires major reinitialisation of the AVK pipeline, and an on-screen glitch of 2-3 seconds, then k would be relatively high, so that, although the average delay time would be longer, the risk of a serious interruption is reduced. Alternatively, if the pipeline could be restarted reasonably quickly, then k could be kept lower, and the average delay reduced. Clearly, many other formulae could also be used to calculate V(+), for example, including some reference to the previous value of V(C), depending on the accuracy and simplicity required.

In an alternative embodiment, use is made of a facility on the AMII card that allows a value for V(L) to be preset. A warning message is then sent to the control process whenever the number of frames falls below that value. In the OS/2 operating system, this message is placed on a queue before forwarding to the control process responsible for transferring frames from the circular buffer to the AVK. The time taken to forward the message depends on the CPU loading and can vary significantly.

When the transfer process is activated by receipt of the warning message it interrogates the AVK as before to find out the current number of frames, V(C), in the AVK. The process knows the value of V(L), which allows it to calculate V(L)-V(C); i.e., the number of frames read out from the AVK between the AVK sending out the message and activation of the process. Because frames are read out from the AVK at a fixed rate, this difference is directly proportional to the time between the AVK sending out the message and activation of the process. This again provides an estimate of the current loading of the CPU which, in turn, can be used to determine how many frames to add to the AVK.

This alternative embodiment suffers from the disadvantage that the effective interval between successive opportunities to replenish the buffer is greater, since one must wait, first of all, for the AVK to be scheduled to send a message, then for transmission of the message by the system and, finally, for scheduling of the control process on arrival. This extra time-lag makes this embodiment less attractive than the first.

Once the control process has determined the number of frames to transfer to the AVK, it can either send this as a single request, or as an appropriate number of requests for individual frames. In the latter case, the circular buffer can respond simply to each request by transferring a frame if available, or inserting a null frame if not.

The particular embodiment described above is determined to some extent by the hardware used and, in particular, to allow operation with the AMII card. This card was designed originally for multimedia applications, where the AVK could be filled with many frames from disk, without regard to the lag between reading and display. Thus, up to 100 frames representing several seconds of video could, typically, be preloaded into the AVK buffer. This is partly why the AVK does not cope well with buffer starvation and requires a long time to reset, since it was never intended to operate at such low buffering levels. By contrast, the circular buffer is relatively unaffected by emptying. This is why the control process is happy to exhaust the frames in the circular buffer to keep the AVK supplied, and even to insert null frames if necessary. It should be noted that, if the relative consequences of buffer starvation were altered, this strategy would have to be adjusted appropriately.

The control process can be implemented as a standard task or thread on the workstation, whilst the circular buffer is maintained in general storage. However, it may also be possible to implement some of the function in hardware if required. Likewise, the hardware/software mix of the AMII card or equivalent may also be changed. The system and method described can also be used to compensate, for example, for lost frames, or if there is a slight discrepancy between the clock rates of the source and destination computers.

What is claimed is:

1. A video system for displaying video images on a display screen, said video system comprising:
    first buffer means for storing frames of a video signal received from an asynchronous network at an irregular frame rate;
    second buffer means for supplying frames to the display screen at a regular frame rate; and
    control means for transferring frames from said first buffer to said second buffer, wherein said control means transfers frames from said first buffer to said second buffer when a current number of frames in said second buffer is below a predetermined limit, and wherein the control means determines a number of frames to transfer from said first buffer to said second buffer in accordance with a level of CPU activity.

2. A video system as claimed in claim 1, wherein said second buffer sends a message to said control means when the current number of frames in said second buffer falls below a predetermined limit, and the level of CPU activity is based on a time taken for the message from said second buffer to reach said control means.

3. A video system as claimed in claim 2, wherein the difference between the current number of frames in said second buffer and the predetermined limit is used to calculate the time taken for the message from said second buffer to reach the control means.

4. A video system as claimed in claim 1, wherein said control means repeatedly interrogates said second buffer to determine the current number of frames therein, and the level of CPU activity is based on a time interval between successive interrogations of said second buffer.

5. A video system as claimed in claim 1, wherein when said first buffer is empty and said second buffer needs more frames, said control means creates null frames for transfer to said second buffer.

6. A video system for displaying video images on a display screen, said video system comprising:
    first buffer means for storing frames of a video signal received from an asynchronous network at an irregular frame rate;
    second buffer means for supplying frames to the display screen at a regular frame rate; and
    control means for transferring frames from said first buffer to said second buffer;
    wherein the video signal is compressed as a sequence of still and relative frames, and when said first buffer is full: (i) if an incoming frame is a still frame, said first buffer is flushed, or (ii) if an incoming frame is a relative frame, said first buffer is flushed up to a first still frame.

7. A video system as claimed in claim 6, wherein said first buffer is implemented as a circular buffer that contains at least one more frame than the maximum number of relative frames between successive still frames.

* * * * *